No. 873,113. PATENTED DEC. 10, 1907.
H. L. WITHERELL.
BRAKE OPERATING ATTACHMENT.
APPLICATION FILED APR. 25, 1907.

2 SHEETS—SHEET 1.

Witnesses
M. E. Fowler
James R. Mansfield

Inventor:
Harry L. Witherell
By Alexander & Fowell
Attorneys

THE NORRIS PETERS CO., WASHINGTON, D. C.

No. 873,113. PATENTED DEC. 10, 1907.
H. L. WITHERELL.
BRAKE OPERATING ATTACHMENT.
APPLICATION FILED APR. 25, 1907.
2 SHEETS—SHEET 2.
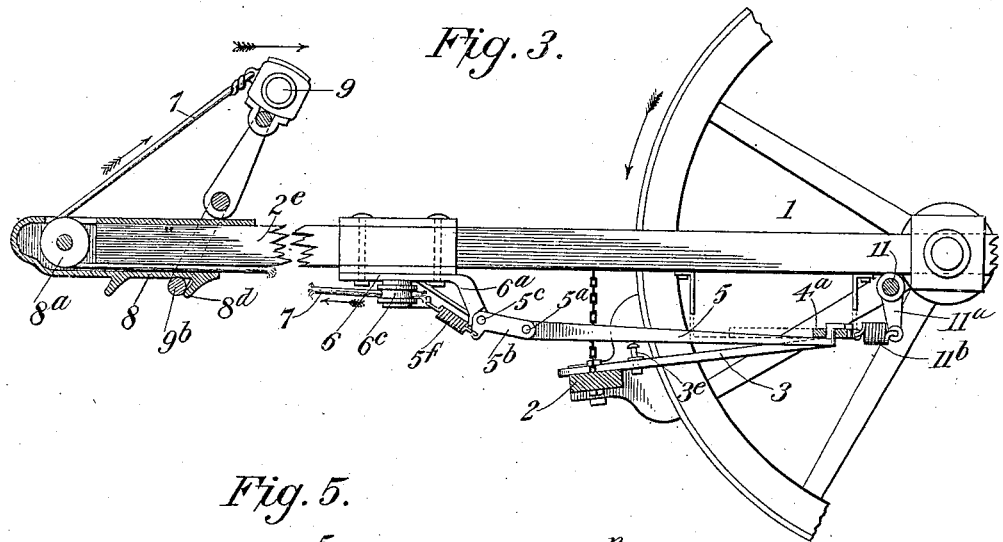
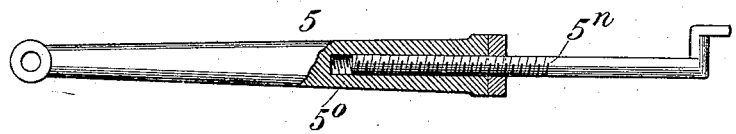
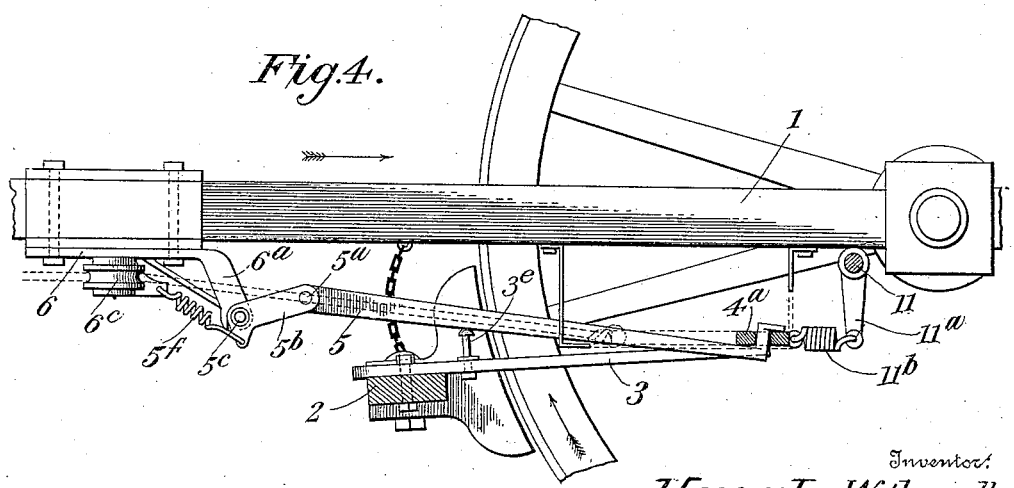
Inventor:
Harry L. Witherell
Witnesses
M. E. Fowler
James B. Mansfield
By Alexander & Fowell
Attorneys

UNITED STATES PATENT OFFICE.

HARRY L. WITHERELL, OF MILAN, ILLINOIS, ASSIGNOR OF ONE-HALF TO CHARLES M. WITHERELL, OF ROCK ISLAND, ILLINOIS.

BRAKE-OPERATING ATTACHMENT.

No. 873,113.　　　Specification of Letters Patent.　　　Patented Dec. 10, 1907.

Application filed April 25, 1907. Serial No. 370,262.

*To all whom it may concern:*

Be it known that I, HARRY L. WITHERELL, of Milan, in the county of Rock Island and State of Illinois, have invented certain new and useful Improvements in Brake-Operating Attachments; and I hereby declare that the following is a full, clear, and exact description thereof, reference being had to the accompanying drawings, which form part of this specification.

This invention is an improved brake operating attachment adapted to be applied to ordinary farm wagons to operate the brake-beam thereof, and particularly adapted for use with what are known as running gear brakes, which are fastened to the running gear of the wagon instead of the box.

The advantages of this attachment are that the setting of the brake is caused by the pulling back of the team, the pull-back pressure being greatly multiplied on the brake blocks, so that the team can control the wagon with very little effort. The setting and releasing of the improved brake when the team is pulling back depends upon which way the vehicle is moving. If it be moving forward the brake will set until, if desired, the wheels are locked; but if the wheels start backward, while the brake is set, the brakes will be automatically released so that the application of this brake to the vehicle will not prevent the proper handling of the team and wagon.

The invention will be thoroughly understood from the following description in connection with the accompanying drawings, which show the brake applied to the running gear of an ordinary farm vehicle.

Figure 1:
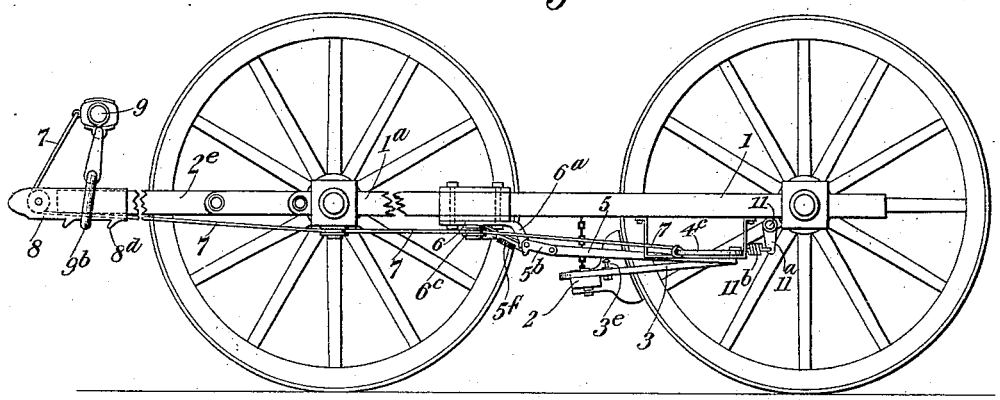
Figure 2:
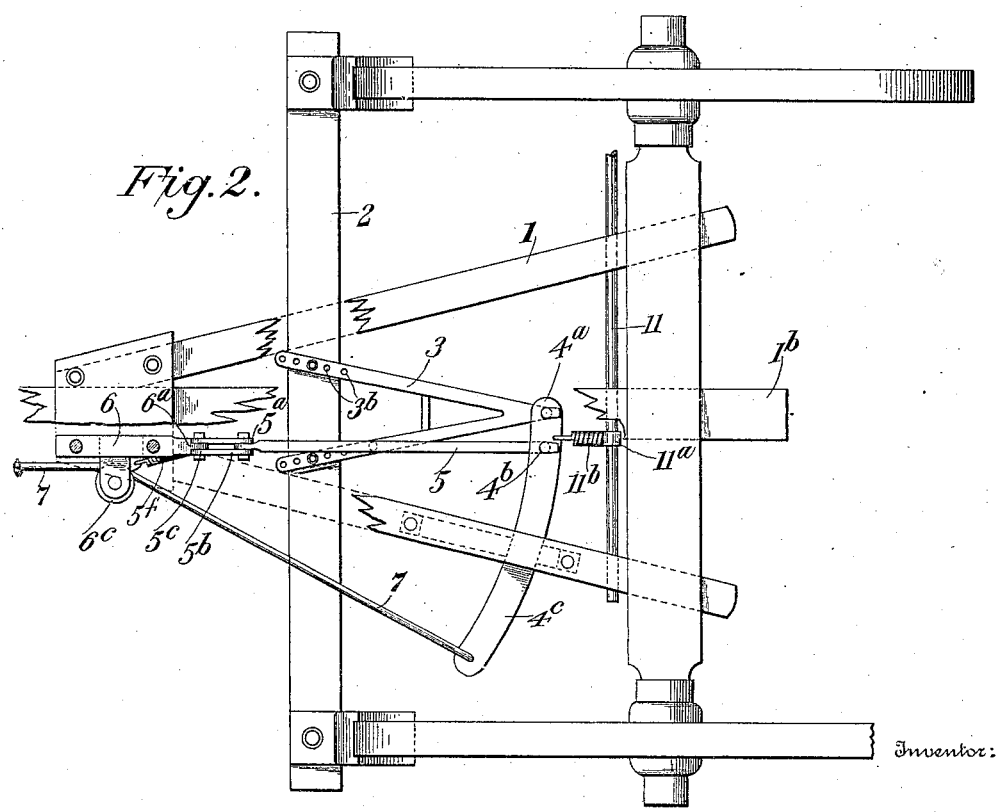

Figure 1 is a side elevation partly broken away and illustrating the complete brake. Fig. 2 a detail plan view showing the brake setting devices enlarged. Fig. 3 an enlarged detail side view of the brake operating levers illustrating the position assumed when the brake is applied. Fig. 4 a similar view showing the parts in the positions assumed when the brake is automatically released by backward motion of the wagon; and Fig. 5 is a detail view showing a slight modification of one of the parts.

The wagon running gear illustrated in the drawings may be of any ordinary construction, having a rear axle frame 1 connected with the front axle frame $1^a$ by the reach $1^b$. The brake beam 2 is suspended from the running gear as usual and carries brake shoes adapted to contact with the forward portions of the rear wheels, and it may be connected in the usual manner to a hand lever on the wagon body, not shown. The hand lever connection forms no part of the invention.

Attached to brake beam 2 is a V-shaped metal strap 3 which is bifurcated as shown so that it can straddle the hand brake connection, not shown, which is always placed at center of the brake beam to give an even pull on the brake shoes.

To the rear end of strap 3 is pivotally connected the short arm $4^a$ of a brake operating lever which is pivoted at $4^b$ to the rear end of a bar 5, the forward end of which is pivotally connected at $5^a$ to one end of a short link $5^b$, the front of which is pivoted to $5^c$ to an ear $6^a$ depending from a block or casting 6 securely bolted to the reach plate in advance of the brake beam. Normally the pivot $5^a$ lies below a line drawn between the pivots $5^c$ and $4^b$, in which position the link $5^b$ is locked by the abutment of its rear end against a shoulder on the casting 6, so that when pressure is applied to the long arm of $4^c$ of the brake operating lever the link $5^b$ and bar 5 will be rigid and the brake beam will therefore be drawn backward and the brakes applied.

The long arm $4^c$ of the brake applying lever is connected to a chain or wire cable 7 which is led forward past a sheave $6^c$ attached to the plate 6, and then passes along in line with and below the tongue $2^e$ of the vehicle to and around a sheave $8^a$ in a casting 8 attached to the forward end of the tongue and forming the hold-back connection of the neck yoke thereto. The forward end of the cable 7 is connected above casting 8 to the neck yoke 9, which is fastened to the horses' collars in the usual manner, not shown, so that if the animals hold back, or pull back upon the neck yoke they will pull the forward end of cable 7 backward and draw its rear end, and the long arm of lever $4^c$ forward, thus applying the brake, and as the long arm $4^c$ of the brake lever is of much greater length than the short arm $4^a$, the brake will be powerfully applied against the wheels. The application of the brake is thus controlled by the team, and when the team moves forward the brake will be off; but it will be applied if the horses hold-back, or if the vehicle runs ahead faster than the horses are traveling.

If desired a connection can be made between the cable 7 and a hand operated lever, not shown, on the vehicle so that the driver can set the brake if he desires to lock the vehicle at any particular place.

In order to more readily adjust the device and take up wear between the brake shoes and the wheels, the strap connection 3 may be provided with a series of holes $3^b$ in its ends, any of which may be engaged by the bolts $3^c$ and which fasten the strap 3 to the brake-beam. And for convenience in adjusting the distance between the pivots $4^b$ and $5^c$, the bar 5 may be made in two sections as indicated in Fig. 5, the rear section $5^n$ having its forward end threaded and screwed into a socket in the forward section $5^o$, as shown.

11 indicates a hand-brake shaft which is provided with a crank $11^a$ connected by a stout spring $11^b$ with the short arm $4^a$ of the brake lever, so that by rocking shaft 11 the brake can be applied in the usual manner.

Upon the strap connection 3, at a point below the bar 5, is a preferably adjustable tap-bolt $3^e$, which is adapted to automatically cause the release of the brake if the wagon is backed; as follows: The brake shoes are arranged preferably in position to contact with the wheels below the horizontal axes thereof. If the team pulls backward on the vehicle, in the first instance the brakes are applied, but the wheels moving backward raise the shoes and brake beam and bolt $3^e$ contacts with the under side of bar 5, said bolt being so adjusted that a slight rise of the brake-beam (caused by the vehicle being moved backward when the brakes are applied) will cause bolt $3^e$ to press bar 5 upward and raise the pivot $5^a$ above the line between pivots $4^b$ and $5^c$, which allows the connection and pivot $4^b$ to move toward pivot $5^c$ as indicated in Fig. 4, thereby releasing the brake pressure on the wheels, lever $4^c$ moving forward until neck yoke ring $9^b$ comes in contact with lug $8^d$ on casting 8.

When the vehicle starts forward the brake beam link $5^b$, and bar 5 drop, the weight of the parts bringing the pivot $5^a$ below the line between the pivots $5^c$ and $4^b$; the return of parts to this position can be expedited by a spring $5^f$ connected to link $5^b$ and casting 6, as shown.

By this mechanism the setting of the brake is caused by the pulling back of the team, which is multiplied on the brake lever; the setting and releasing of the brake, when the team is pulling back, depends upon which way the vehicle is moving—if it is moving ahead the brake will be set hard, but if the wheels start backward while the beam is set the brake beam will be lifted as described, until the jointed connection yields and the brake is released.

This team operated brake can be used in combination with the ordinary hand brake. It may also be connected with a lever to be operated by hand; and it may be so connected that it may be operated by the team or by hand independently.

Having described my invention what I claim as new and desire to secure by Letters Patent is:

1. In a vehicle brake, the combination of a brake-beam, a strap connected thereto, a bar pivotally connected with the running gear adjacent said strap, a lever pivotally connected to the rear end of said bar and having its short arm pivotally connected to said strap, and a cable connected to the long arm of said lever and to the neck yoke whereby when the horses hold back the brake is applied.

2. The combination of a vehicle running gear and brake beam, a casting attached to the running gear, a link pivoted to said casting, a bar pivotally connected to said link, a lever pivoted to the rear end of said bar; a strap connecting the short arm of said lever to the brake-beam, and brake applying devices connected with the long arm of said lever.

3. The combination of a running gear, a brake-beam, a casting attached to the running gear in front of the brake-beam, a link pivoted to said casting, a bar pivotally connected to said link, a lever pivoted to the rear end of said bar, a strap connecting the short arm of said lever to the brake-beam, and a cable connected with the long arm of said lever, and to the neck yoke whereby when the team holds back the brake is applied.

4. The combination with a vehicle running gear and brake-beam, a link pivotally connected to the running gear, a bar pivotally connected to said link, a lever pivoted to the rear end of said bar, a strap connecting the short arm of said lever to the brake-beam, and brake applying devices connected with the long arm of said lever, the pivotal connection between the bar and link lying normally below the pivots of the link to the gear and of the bar to the lever, whereby when the wagon is backed the brake-bar and the pivotal connections between the link and bar will be raised so as to release the brake.

5. The combination of a vehicle running gear, and brake-beam, a casting attached to the running gear in front of the brake-beam, a link pivoted to said casting, a bar pivotally connected to said link, a lever pivoted to the rear end of said bar, a strap connecting the short arm of said lever to the brake-beam, and a cable connected with the long arm of said lever and to the neck yoke, whereby when the team holds back the brake is applied, the pivotal connection between the bar and link lying normally below the pivots of the link to the casting and the bar to the lever, whereby when the wagon is backed the brake bar and the pivotal connections between the link and bar are raised and the brake released.

6. In combination a vehicle running gear, a brake-beam, a strap connected to said beam, a casting connected to the running gear, a link pivotally connected to said casting, a bar pivotally connected to said link and extending rearwardly, a brake lever pivotally connected to the rear end of said bar having its short arm pivotally connected to said strap, and means for operating said lever to apply the brake, said means comprising a cable connected to the long arm of said lever and extending forward to the tongue, and a sheave on the tongue through which the cable is led, to be connected to the neck yoke or hold-back of the harness.

7. The combination with the running gear of a wagon, a brake-beam, and a sheave pulley on the wagon tongue, a strap adjustably connected to the brake-beam, a casting connected to the running gear in front of the brake-beam, a link pivotally connected to said casting at one end, a bar pivotally connected to the other end of said casting, a lever pivotally connected to the rear end of said bar and having its short arm pivotally connected to said strap, said bar being made adjustable in length, and means for operating the lever to apply the brake, the parts being so arranged that when the vehicle is moved backward the rise of the brake-beam raises the pivotal connection between the link and bar and releases the brake.

8. In a vehicle brake, the combination of running gear, a brake-beam, a V-shaped strap connected to said beam at its bifurcated end, a link pivotally connected to the reach plate of the running gear, a bar pivotally connected to said link and extending rearwardly, a brake lever pivotally connected to the rear end of said bar having its short arm pivotally connected to said strap, a cable connected to the long arm of said lever and extending forward to the tongue, a sheave on the tongue through which the cable is led and connected to the neck yoke or hold-back of the harness whereby when the team holds back the brake is applied.

9. The combination with the running gear of a wagon, of a brake-beam, a sheave pulley in the wagon tongue, a strap adjustably connected to the brake-beam, a casting connected to the running gear reach plate in front of the brake-beam, a link pivotally connected to said casting at one end, a bar pivotally connected to the other end of said casting, a lever pivotally connected to the rear end of said bar and having its short arm pivotally connected to the strap, and an adjustable device between the strap and bar whereby when the vehicle is moved backward the rise of the brake-beam raises the pivotal connection between the link and bar and releases the brake, and means for operating the lever to apply the brake comprising a cable connected to the long arm of said lever and to the harness whereby when the team holds back the brake is applied.

In testimony that I claim the foregoing as my own, I affix my signature in presence of two witnesses.

HARRY L. WITHERELL.

Witnesses:
W. B. McINTYRE,
JAMES F. WITTER.